Sept. 29, 1931.     A. WRIGHT ET AL     1,825,295
FILTER
Filed Feb. 28, 1928     3 Sheets-Sheet 2

Sept. 29, 1931.  A. WRIGHT ET AL  1,825,295
FILTER
Filed Feb. 28, 1928  3 Sheets-Sheet 3
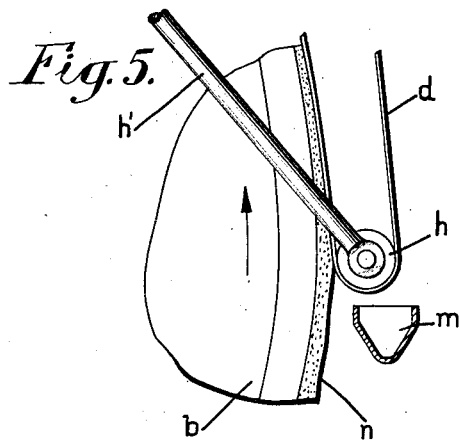
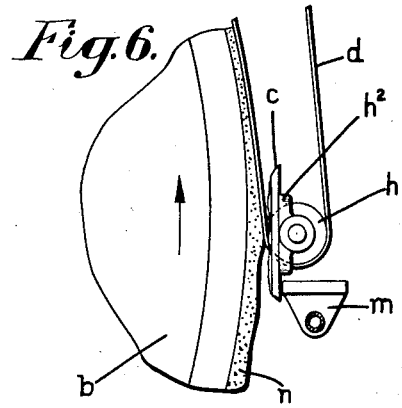
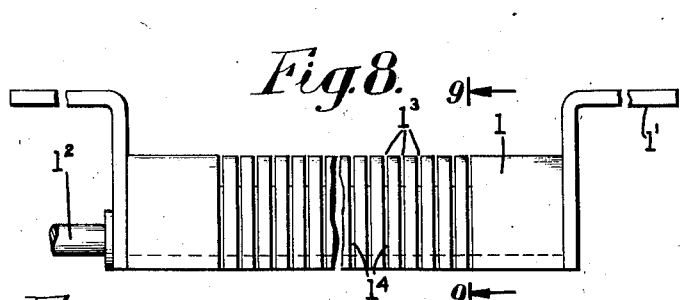
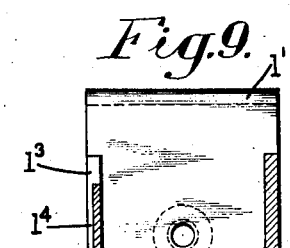
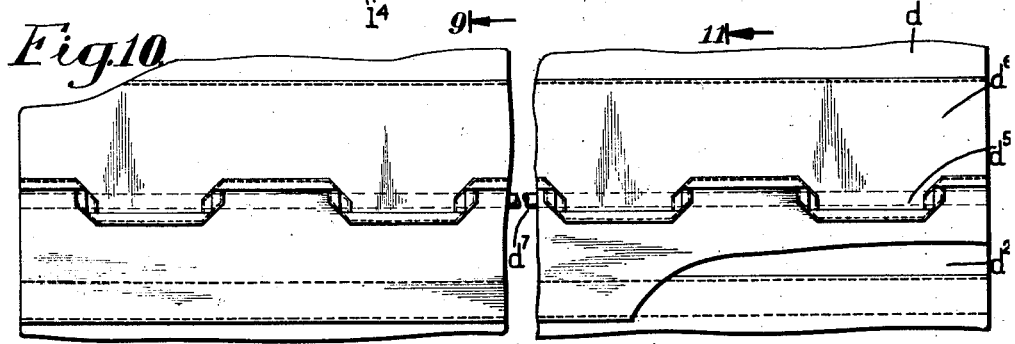
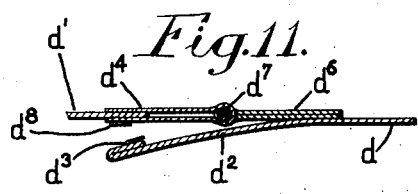
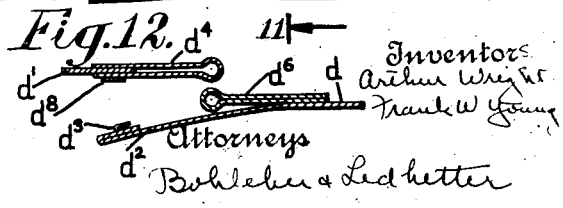

Patented Sept. 29, 1931

1,825,295

UNITED STATES PATENT OFFICE

ARTHUR WRIGHT, OF UPPER MONTCLAIR, AND FRANK W. YOUNG, OF VERONA, NEW JERSEY

FILTER

Application filed February 28, 1928. Serial No. 257,722.

The present invention relates generally to devices for filtering liquids and deals particularly with that class of such devices including rotating drums carrying a filter cloth on their external peripheries and being partially submerged in a filter tank. The cylindrical surfaces of such drums are divided into compartments which are provided with suitable drainage members permitting the filtrate to be removed from beneath the filter cloth.

Devices of the above character are illustrated in the United States Patent No. 1,472,574 to Wright and Young and the present invention relates to improvements over the existing devices described above and shown in the above cited patent.

The features embodied herein, and constituting the means whereby a new effect is produced in accordance with the present invention, have been developed after a careful study of the conditions surrounding the operation of the above filters and their use, have been found to increase the efficiency and serviceability of these devices beyond that afforded by any existing structure and to an extremely gratifying degree.

An object of this invention is to produce a more uniform washing of the residue carried upon the filter cloth and accordingly an improved device is provided for exerting a uniform pressure upon the residue carried by the filter cloth, regardless of the irregularity of depth of such residue. This insures a uniform density of compressed residue, whereby the washing thereof is rendered more effective.

Further features of the present invention are the provision of means for insuring the correct alignment of the compressor belt as well as means for ironing the belt and also removing wrinkles that may be formed therein as it comes from the compressed residue, thus effecting a more efficient operation. In connection with these features, it is further proposed to provide improved washing devices to insure the correct amount of washing fluid being discharged over the belt at the proper points.

The uniting of the ends of the compressor belt is also improved in the present construction and by means of the improved connection provided herein, the removability of the belt is greatly increased.

A further improvement in the aforementioned principle of operation also lies in the specific manner of deflecting the cake or residue deposited upon the filter cloth.

These features will be described more fully with reference to the accompanying drawings, wherein:

Figure 5 is a view in side elevation showing the manner in which the floating belt roll is mounted and the means for collecting the excess wash water.

Figure 6 is a view showing a modified form of mounting for the belt roller shown in Figure 5.

Figure 7 is a view in elevation of an improved form of roller for the compressor belt whereby wrinkles which may have been formed therein are removed.

Figure 8 is a view in elevation showing the wash water distributing trough.

Figure 9 is a view in section, taken on line 9—9 of Figure 8, and showing the distributing trough.

Figure 10 is a plan view showing the manner in which the ends of the compressor belt are joined.

Figure 11 is a section taken on lines 11—11 of Figure 10 and looking in the direction of the arrows.

Figure 12 is a view of the ends of the belt before being connected.

Figure 1:
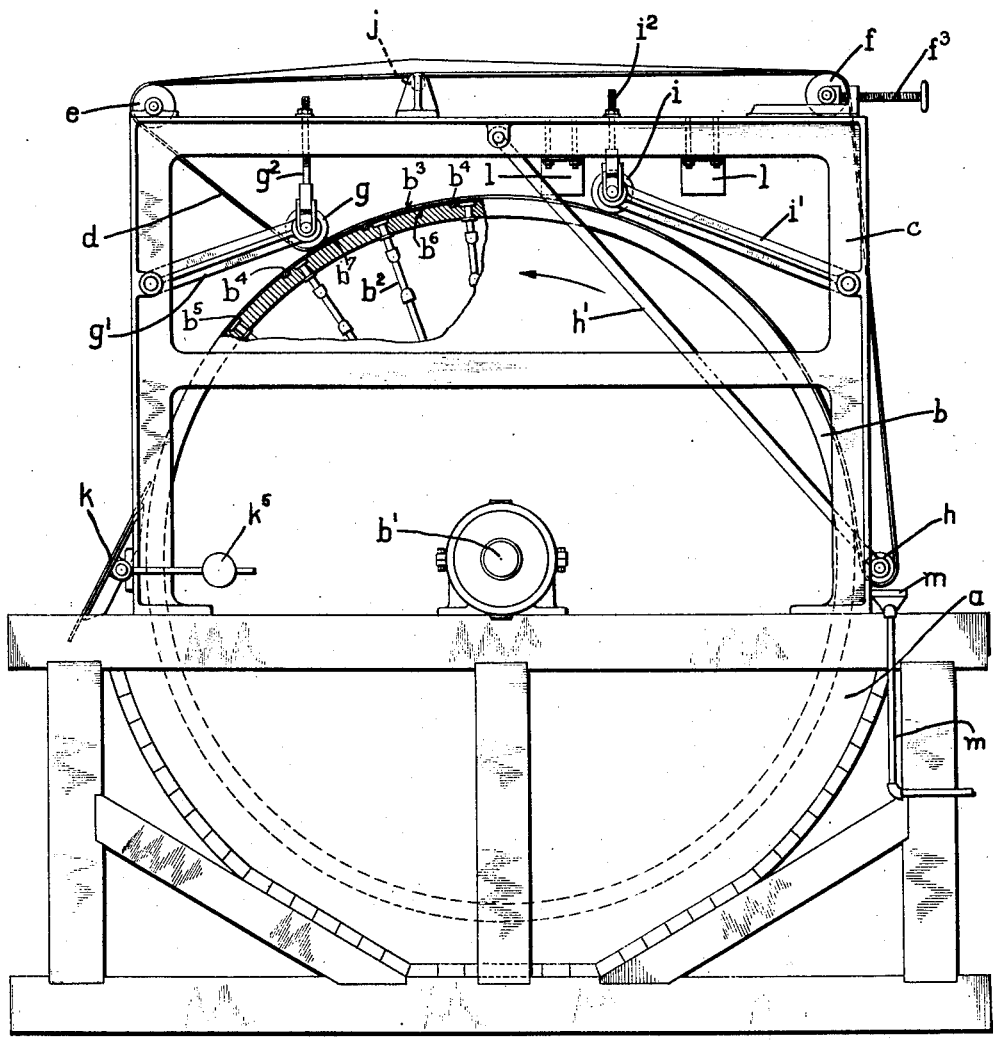
Figure 1 is a view in end elevation, partly broken away, showing the manner in which the compressor structure is mounted and the means for washing and deflecting the residue.

Referring particularly to Figure 1, $a$ designates a filter tank in which a filter drum $b$ rotates. The drum is mounted rotatably in trunnions $b'$ and carries drain lines $b^2$ communicating, respectively, with the compartments $b^3$ under the filter cloth. These compartments $b^3$ are formed by the partition strips $b^4$ which subdivide the space between the filter cloth $b^5$ and the peripheral surface $b^6$ of the filter. The compartments $b^3$ may, of course, be provided with any sort of draining member serving to support the filter cloth and affording passage of the filtrate to the drain lines $b^2$. A drainage member formed of spirally woven wire mesh $b^7$ is shown but it will be understood that other types of drainage members are equally effective. A compressor frame $c$ is mounted upon the tank over the drum $b$ and carries a plurality of compressor rollers as described hereinafter. Reference character $d$ designates a compressor belt passing over idler roller $e$, take up and aligning roller $f$, and floating rollers $g$ and $h$ respectively.

Suitable adjusting screws $f^3$ adjust the roller $f$ to take up and also to align belt $d$ to the desired position, and roller $g$ is pivotally carried upon the frame $c$ through link $g'$. The position of roller $g$ is also controlled by adjusting rod $g^2$. Floating roller $h$ is pivotally mounted upon the compressor frame by means of link $h'$.

Figure 2:
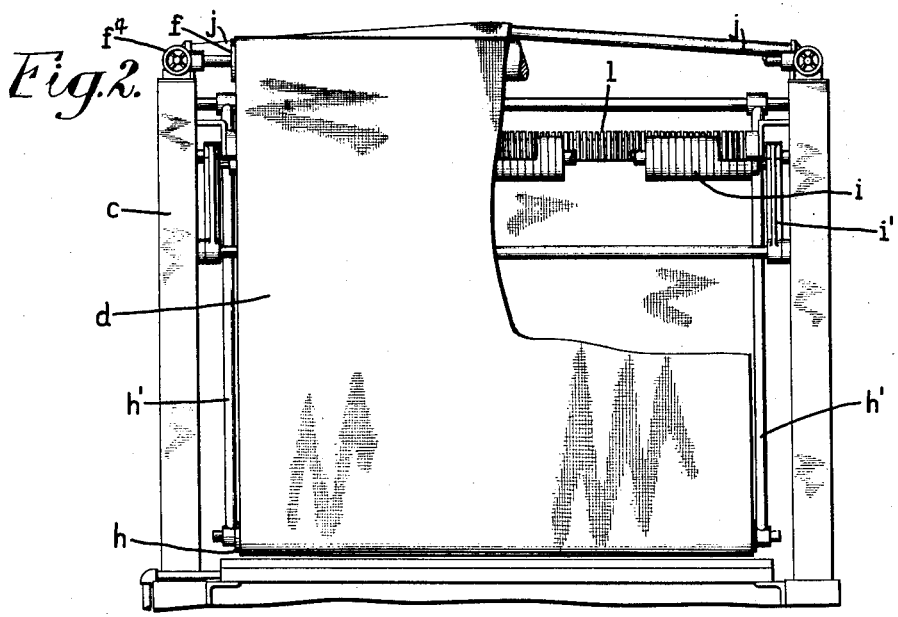
Figure 2 is a view in front elevation, partly broken away, showing the compressor structure and the specific form of improved roll.

A pressure roller $i$ is pivotally mounted upon the compressor frame through link $i'$ and an adjusting rod $i^2$ permits the compression upon the belt to be varied as desired. Between rollers $e$ and $f$, the belt passes over an ironer bar $j$ (see Figure 2) which serves to smooth out the belt after it comes from the filter cloth. This bar $j$ may take any desired form but is illustrated as a pipe $j$ curved on the arc of a circle to provide a crown of about two inches at its centre. A cake or residue deflector $k$ is provided for removing the cake from the filter cloth after it has been compressed and washed by water flowing from the distributing trough $l$. Any excess wash water is collected by trough $m$ and carried away by pipe $m'$.

Figure 3:
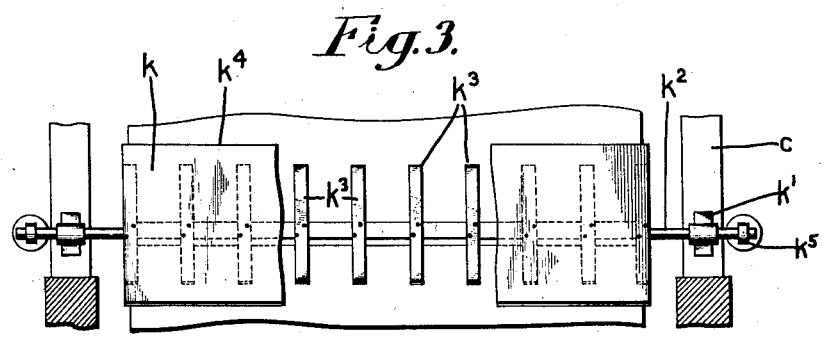
Figure 3 is a view, partly broken away, showing the deflector construction.

The specific deflector construction will be more apparent from an inspection of Figure 3 wherein $k'$ represents brackets mounting a bar $k^2$ pivotally upon the compressor frame $c$. L or T-shaped irons $k^3$ are secured to the bar $k^2$ and carry the deflector blade $k^4$. A weight $k^5$ is mounted upon the bar $k^2$ and serves to maintain the deflector blade in yielding engagement with the filter cloth upon the drum $b$.

Figure 4:
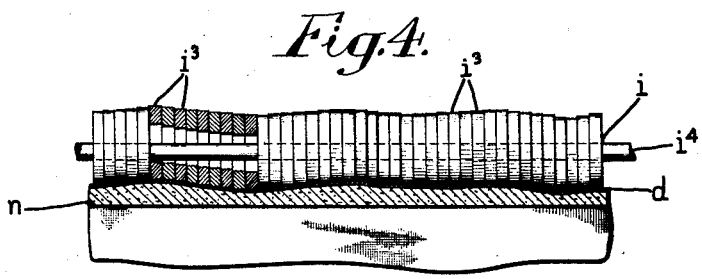
Figure 4 is a view, partly in section, showing the improved compressor roll construction.

Figure 4 shows the specific form of pressure roller utilized to exert a desired uniform pressure upon every portion of the cake. Of course any of the other rollers could be similarly constructed. The roller is composed of a plurality of annular rolls $i^3$ carried loosely upon pivoted bar $i^4$. The rolls are formed to exert a desired pressure upon the area under the roll and in this manner irregularities in the thickness of the cake are provided for. Figure 4 shows clearly, in exaggerate form, the condition existing under the roller. The cake $n$ is shown as having an irregular thickness such as it frequently assumes upon a filter cloth during filtration and the rolls $i^3$ thus automatically adjust themselves to compensate for or conform to such irregularities, so that a uniform density of the cake is insured. By means of the compressor belt and roller, the cake is compacted and the moisture squeezed out. Applying a uniform pressure to the entire area of the cake prevents the formation of fissures or cracks and causes the wash water to permeate the cake uniformly. In addition to the above, the amount of air sucked through is minimized, since cracks and fissures, which would permit air to be sucked through, are eliminated.

The customary method of washing the cake on continuous drum filters has been to apply the water as a fine spray upon the surface of the cake. If too much water is applied the excess trickles down the cake surface and thins out the material being filtered and forms gutters therein. If insufficient water is applied the washing is inefficient.

There has been developed this new means of washing the cake wherein the belt is made of absorbent or porous material so that water played upon its surface is easily sucked through the belt and percolates or permeates through the cake on the filter drum. More water is always added than is sucked through the belt and cake thus providing an overwetted surface, the excess water draining down the belt and being caught in the collecting trough under the belt. By this means there is always had excess water and by the application of water at the desired point there can always be obtained a complete washing effect of the cake. The water fed to the washing trough need not be under high pressure as is required with sprays and there is no drifting of the spray due to wind or cross currents which is another cause of inefficiency in the customary methods.

Figures 5 and 6 show the manner in which the cake is initially compressed by the compressor belt. In Figure 5 the roller $h$ is floated by means of link $h'$. As so supported it squeezes off the excess sloppy and wet cake which falls back into the tank. In Figure 6 the roller $h$ is stationary and brackets $h^2$ secure the roller to the frame $c$.

The construction of the compressor belt smoothing roller $f$ is shown in detail in Figure 7 wherein $f'$ is a rod for mounting the roller pivotally upon the frame. Welded upon, or cast with roller $f$ are reverse threads $f^2$ and it will be apparent that as the belt passes over the roller, the portions on either side of the center of the belt will be worked outwardly, causing the belt to be stretched out properly. The oppositely extending arrows above the threads indicate the direction in which the sides of the belt will be worked. While this roller $f$ may replace any one of the rolls $e, f,$ or $h$ or all of them it is preferred to locate it as shown so that the belt travels in contact therewith after leaving the ironer bar $j$ which has removed any wrinkles which may have formed in the belt.

The wash water distributing troughs are shown in Figures 8 and 9. The troughs $l$ are secured to the compressor frame by means of brackets $l'$ and a pipe $l^2$ carries water to the trough. Notches $l^3$ are formed in the lip of the trough and constitute a series of spaced wiers over which the wash water flows. Spout shaped grooves $l^4$ receive the water from the notches and cause it to fall upon the compressor belt. By means of the above construction the quantity of wash water can be very carefully regulated.

Figures 10, 11 and 12 show the manner in which the ends of the compressor belt are joined. At one end $d'$ of the belt a piece of fabric $d^4$ is turned back upon itself and the turned back flaps are sewed together on either side of the end $d'$ of the belt $d$. The creased end of the fabric is then cut to form spaced notches $d^5$ in which the creased portions of a second fabric strip $d^6$ lie. A rod $d^7$ is then passed through the oppositely extending loops of the fabric strips and serves to hinge the portions together. The turned back portions of the strip $d^6$ are sewed to the top of the end $d^2$ which is of sufficient length to lie under the entire hinge portion. The end $d^2$ is provided with hooks $d^3$ to engage eyes $d^8$ scured to the under side of the end $d'$ and in this manner a smooth and strong joint is provided. The cut portions of the fabric flaps are hemmed as indicated in Figure 10, thus serving to increase the life of the joint.

What we claim is:

1. Apparatus of the class described comprising in combination a rotary drum type filter turning in a tank and having a filtering medium fixed upon its peripheral surface, a compressor belt adapted to contact with the filter cake on the filtering medium, rollers about which the said belt travels, one of said rollers being disposed at a point adjacent to that at which the drum surface leaves the filter tank, said roller being mounted on an arm movable about a fixed point so as to urge the said belt against the filter cake upon the filtering medium with a force dependent on the tension of the belt and means for varying the tension of the belt.

2. Apparatus of the class described comprising in combination a rotary drum type filter, a compressor belt adapted to contact with the filter cake on the filter, and means to distribute wash water upon the filter belt comprising a trough extending transversely of the belt and provided with a plurality of wiers over which the water flows.

3. Apparatus of the class described comprising in combination, a rotary drum type filter, a compressor belt and rollers about which said belt travels, one of said rollers being formed with reversely extending threads to work the sides of the belt outwardly from its median line.

4. Apparatus of the class described comprising in combination, a rotary drum type filter, a compressor belt and an ironer bar with which the belt contacts.

5. Apparatus of the class described comprising in combination, a rotary drum type filter, a compressor belt and an arcuate ironer bar with which the belt contacts.

6. Apparatus of the class described comprising in combination, a rotary drum type filter, a compressor belt and a crowned ironer bar with which the belt contacts.

7. A compressor belt for rotary drum type filters and means to join the ends thereof to preserve the continuity of surface and reenforcing means for the joint.

8. A compressor belt for rotary drum type filters comprising a continuous compressor belt whereof the proximate ends are provided with interengaging hooks and eyes, flaps secured to the respective ends of the belt and a rod passing through loops in the flaps to secure the ends of the belt and prevent separation thereof.

9. Apparatus of the class described comprising in combination, a rotary drum type filter, a compressor belt and rollers about which said belt travels, one of said rollers being formed with reversely extending threads to work the sides of the belt outwardly from its median line and means to adjust said reversely threaded roller.

10. Apparatus of the class described comprising in combination a rotary drum type filter turning in a tank and having a filtering medium fixed upon its peripheral surface, a compressor belt adapted to contact with the filter cake on the filtering medium, rollers about which the belt travels and means mounted to move bodily toward and away from said drum and to press on said belt adjacent the point at which the drum surface leaves the filter tank, said means being so mounted that said belt travels around the said means, said means operating to urge said belt against the filter cake upon the filtering medium with a force dependent on the tension of the belt, and means for varying the tension of said belt to vary said force and the pressure of said belt against the filter cake.

11. Apparatus of the class described comprising in combination a rotary drum type filter turning in a tank and having a filtering medium fixed upon its peripheral surface, a compressor belt adapted to contact with the filter cake on the filtering medium, rollers about which the belt travels, a roller mounted to move bodily toward and away from said drum and to press on said belt in proximity to the point at which the drum surface leaves the filter tank to urge the said belt against the filter cake upon the said filtering medium with a force dependent on the tension of the belt, and means for varying the tension of the said belt to vary said force and the pressure of said belt against the filter cake.

In testimony whereof we affix our signatures.

ARTHUR WRIGHT.
FRANK W. YOUNG.